United States Patent
Chiou

(10) Patent No.: US 8,367,944 B2
(45) Date of Patent: Feb. 5, 2013

(54) CABLE AND FLEXIBLE CONDUIT GLAND

(75) Inventor: Jiun-Wei Chiou, Taipei County (TW)

(73) Assignee: AVC Industrial Corp., Taipei County (TW)

(*) Notice: Subject to any disclaimer, the term of this patent is extended or adjusted under 35 U.S.C. 154(b) by 294 days.

(21) Appl. No.: 12/844,713

(22) Filed: Jul. 27, 2010

(65) Prior Publication Data
US 2012/0024590 A1 Feb. 2, 2012

(51) Int. Cl.
*H05K 5/00* (2006.01)

(52) U.S. Cl. ........ 174/520; 174/480; 174/653; 174/660; 439/583; 439/462; 285/382.7; 248/56

(58) Field of Classification Search .................. 174/480, 174/520, 653, 655–658, 660; 439/583, 584, 439/462, 581; 248/56; 285/382.7
See application file for complete search history.

(56) References Cited

U.S. PATENT DOCUMENTS

| 4,015,329 A * | 4/1977 | Hutchison ........................ 29/858 |
| 5,929,383 A * | 7/1999 | Marik et al. ..................... 174/78 |
| 7,183,486 B2 * | 2/2007 | Pyron et al. ..................... 174/59 |

* cited by examiner

*Primary Examiner* — Dhirubhai R Patel
(74) *Attorney, Agent, or Firm* — Ming Chow; Sinorica, LLC

(57) ABSTRACT

A cable and flexible conduit gland for securing a cable and a flexible conduit to a box member is disclosed to include a casing having a middle stop flange extending around the periphery thereof, a first fastening member and a second fastening member formed integral with the periphery thereof and respectively disposed at two opposite sides relative to the middle stop flange ad and a tapered inner surface portion located on the inside wall, a collar inserted into the casing and having a tapered front extension fitting the tapered inner surface of the casing, an elastic packing ring stopped against the rear end of the collar, and a holding-down cap fastened to the first fastening member of the casing to hold down the collar and the packing ring and to lock the inserted flexible conduit and cable together.

10 Claims, 4 Drawing Sheets

CABLE AND FLEXIBLE CONDUIT GLAND

BACKGROUND OF THE INVENTION

1. Field of the Invention

The present invention relates to a cable and flexible conduit gland and more particularly, to a cable and flexible conduit gland, which locks the installed cable and flexible conduit positively together and exhibits excellent waterproof effects.

2. Description of the Related Art

In an automatic machine, the transmission of a control signal is performed through a cable that has its one end connected to a signal receiver or signal source and its other end connected to a signal output device. The connection between the cable and the signal receiver or signal source is achieved by means of a connector or gland. However, penetration of rainwater, dust or vermin into the signal receiver or signal source may cause a short circuit and an unexpected fire accident. To void this problem, a flexible conduit may be mounted around the cable for protection against outside rainwater, dust or vermin.

However, the cable may be disconnected or loosened from the connector or gland when stretched accidentally by an external force, causing leakage. To avoid this problem, a cable gland shall be used. A prior art design of cable gland is known comprising a first casing, a packing ring, a sealing nut, a lock nut, a holding down cap, an inner retaining ring, an elastic ring and a second casing. After installation, the packing ring is forced to wrap about the cable tightly, thereby locking the cable and protecting against moisture.

The aforesaid prior art cable gland simply provides one single-layer locking function. The clamping force is applied through the packing ring to the cable at a single point around the periphery of the cable. This clamping force is insufficient to lock the cable. When the cable is stretched accidentally by an external force, it may be disconnected from the signal receiver or signal source. Further, the clamping force of the packing ring is insufficient to protect the signal receiver or signal source against outside moisture.

Therefore, it is desirable to provide a cable and flexible conduit gland, which eliminates the aforesaid problems.

SUMMARY OF THE INVENTION

The present invention has been accomplished under the circumstances in view. It is therefore the main object of the present invention to provide a cable and flexible conduit gland for securing a cable and a flexible conduit, which locks the inserted cable and flexible conduit firmly together and exhibits excellent waterproof effects.

To achieve this and other objects of the present invention, a cable and flexible conduit gland comprises a casing, which comprises an axial through hole cut through front and rear ends thereof, a middle stop flange extending around the periphery thereof, a first fastening member and a second fastening member formed integral with the periphery thereof and respectively disposed at two opposite sides relative to the middle stop flange, and a tapered inner surface portion located on an inside wall thereof, a collar, which is inserted into the axial through hole of the casing, comprising a tapered front extension fitting the tapered inner surface of the casing and an axial through hole cut through front and rear ends thereof, an elastic packing ring stopped against the rear end of the collar, and a holding-down cap fastened to the first fastening member of the casing to hold down the collar and the packing ring to lock the flexible conduit and the cable together.

When compared to the conventional design that simply uses its one end to hold down the inserted flexible conduit, the invention uses the elastic packing ring and the collar to hold down the inserted flexible conduit and the inserted cable respectively. Further, the tapered inside wall and the tapered front extension of the collar are respectively compressed against the inserted flexible conduit and the inserted cable, enhancing the pressure to hold down the inserted flexible conduit and cable. Further, the component parts of the cable and flexible conduit gland fit one another perfectly to exhibit excellent waterproof effects, meeting IP-68 requirements.

Further, the collar comprises a rear stop flange extending around the periphery at the rear end thereof for stopping against the rear end of the casing, an outer step for stopping against a part inside the casing, a tapered inside wall for attaching to the periphery of the inserted flexible conduit and an inner step disposed at a front side relative to the tapered inside wall for stopping against the inserted end of the inserted flexible conduit.

Further, the collar has at least one dent extending around the periphery of the tapered front extension. For locking a cable that has a relatively greater outer diameter, cut off the front part of the tapered front extension of the collar along one dent so that the diameter of the front end of the axial through hole of the collar becomes greater for accommodating a relatively thicker cable.

Further, the holding-down cap comprises an axial through hole extending through front and rear ends thereof and surrounded by an inside wall thereof, and a beveled edge located on the inside wall around the axial through hole thereof for stopping against the rear end of the elastic packing ring.

DETAILED DESCRIPTION OF THE PREFERRED EMBODIMENT

The present invention provides a cable and flexible conduit gland that uses a tapered rubber collar to secure a flexible conduit and a cable together and an elastic packing ring to engage the flexible conduit, avoiding disconnection or relative displacement between the flexible conduit and the cable and achieving IP-68 waterproof rating.

Figure 1:
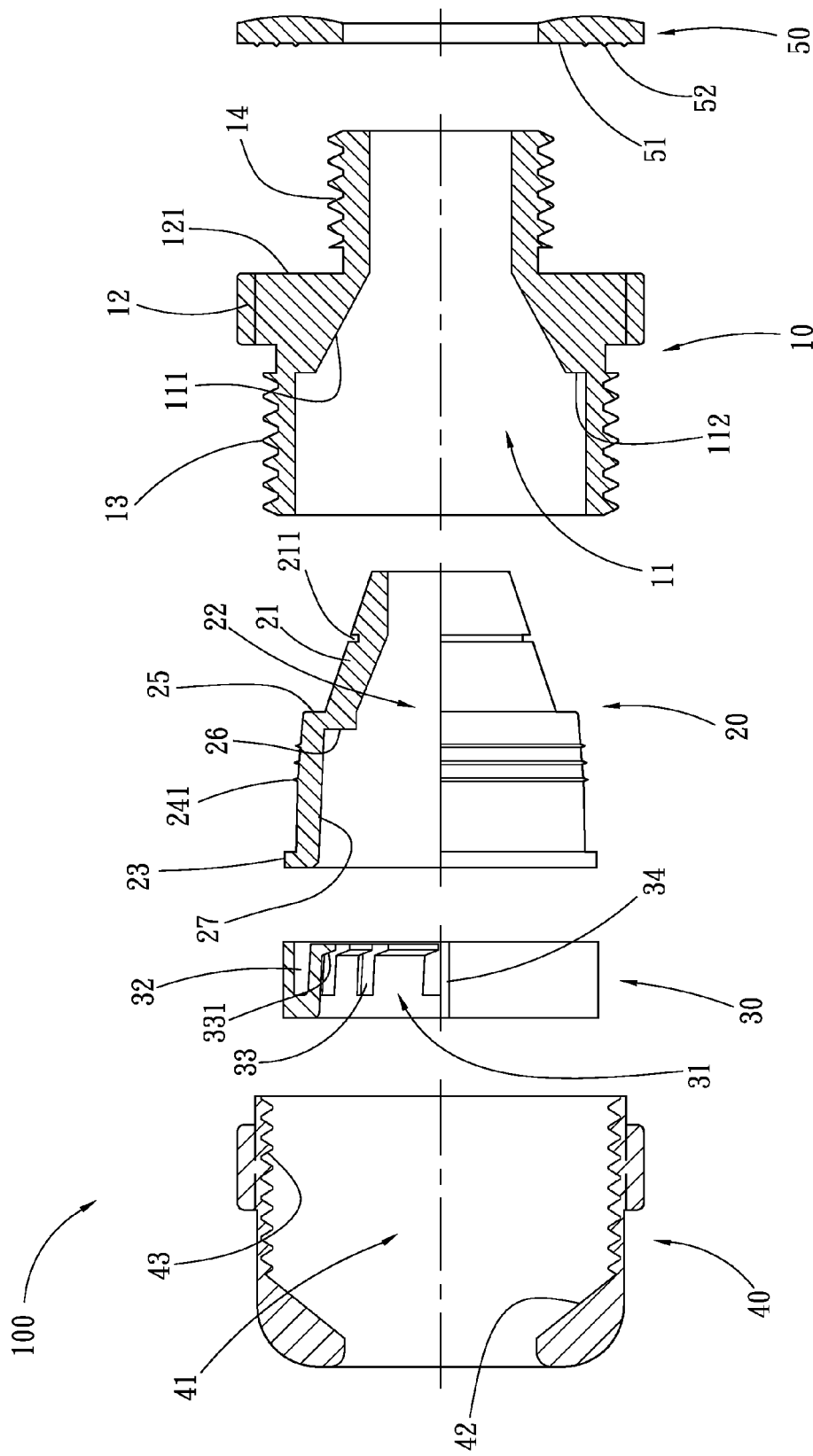
FIG. 1 is an exploded view in section of a cable and flexible conduit gland in accordance with the present invention.
Figure 2:
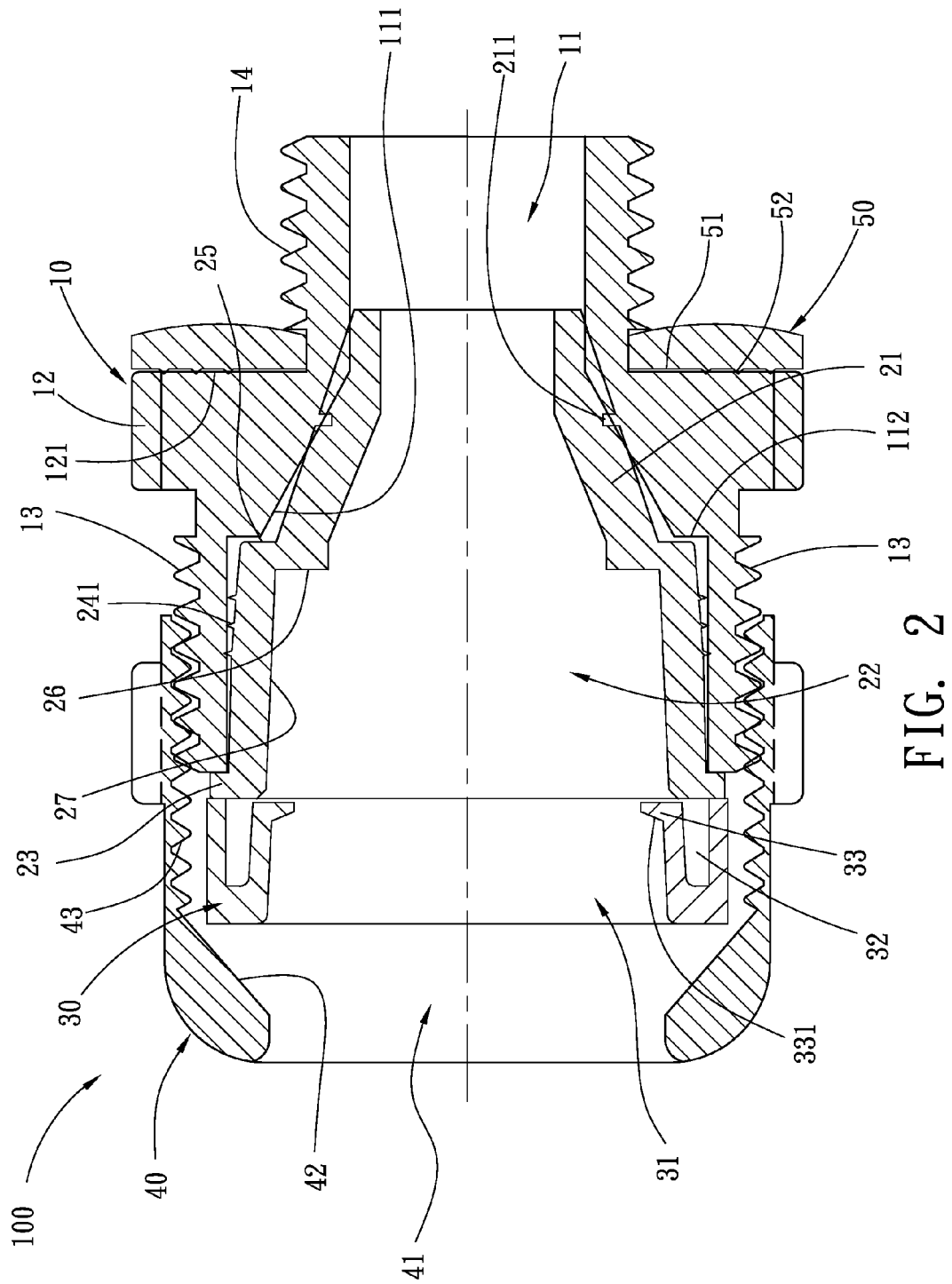
FIG. 2 is a sectional assembly view, in an enlarged scale, of the cable and flexible conduit gland shown in FIG. 1.
Figure 3:
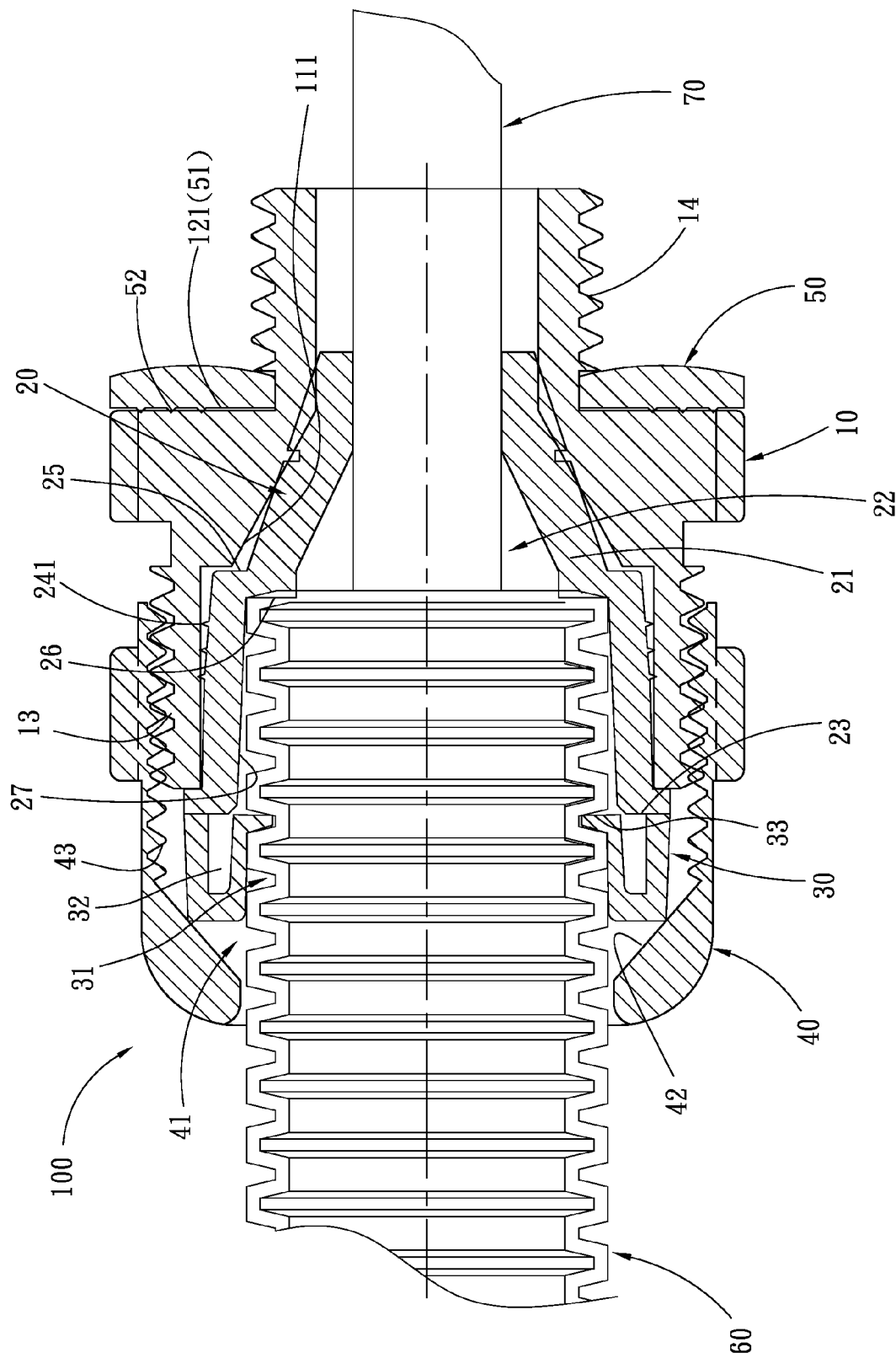
FIG. 3 is a schematic sectional view of the present invention, showing the cable and flexible conduit gland used with a small-diameter cable.
Figure 4:
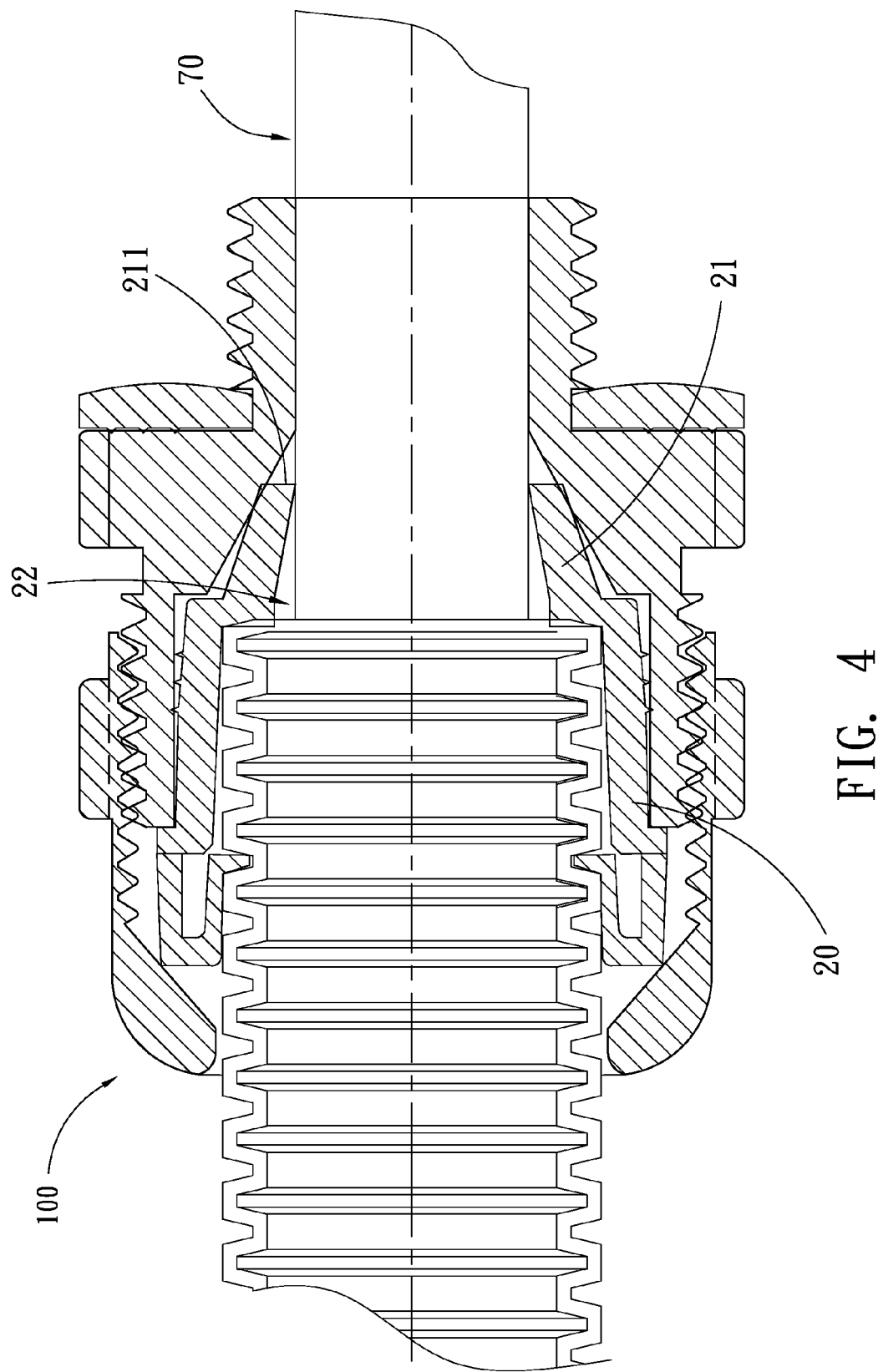
FIG. 4 is a schematic sectional view of the present invention, showing the cable and flexible conduit gland used with a big-diameter cable.

Referring to FIGS. 1, 2 and 3, a cable and flexible conduit gland 100 in accordance with the present invention is shown for securing a flexible conduit 60 and a cable 70 together, comprising a casing 10, a collar 20, an elastic packing ring 30 and a holding-down cap 40.

The casing 10 comprises an axial through hole 11 cut through two distal ends thereof, a stop flange 12 extending around the periphery thereof on the middle, a first fastening member 13 and a second fastening member 14 formed integral with the periphery and respectively disposed at two opposite sides relative to the stop flange 12, a tapered inner surface portion 111 located on the inside wall thereof on the middle around the axial through hole 11. According to the present preferred embodiment, the first fastening member 13 and the second fastening member 14 are outer threads extending around the periphery of the casing 10.

The collar 20 is inserted into the axial through hole 11 of the casing 10 and positioned in the casing 10, comprising a tapered front extension 21 fitting the tapered inner surface 111 of the casing 10 and an axial through hole 22 cut through two distal ends thereof.

Referring to FIGS. 1~3 again, the collar 20 is made of an elastic material, such as rubber, plastics or silicon rubber. When inserting the collar 20 into the casing 10 to force the tapered front extension 21 of the collar 20 against the tapered inner surface 111 of the casing 10, the tapered front extension 21 is contracted and clamped on the periphery of the cable 70.

The elastic packing ring 30 is stopped against one end, namely, the rear end of the collar 20.

The holding-down cap 40 is fastened to the first fastening member 13 of the casing 10 to hold down the collar 20 and the packing ring 30, thereby locking the flexible conduit 60 and the cable 70 together and providing a waterproof effect.

The elastic packing ring 30 comprises a center hole 31, an endless groove 32 located on one end, namely, the front end thereof around the center hole 31, a plurality of pawls 33 extended from the inside wall and equiangularly spaced around the center hole 31, and a split 34. Each pawl 33 has a beveled edge 331.

Further, the casing 10 comprises an inner step 112 extending around the inside wall thereof and abutted against one end of the tapered inner surface portion 111. Further, the collar 20 comprises a stop flange 23 extending around the periphery of one end, namely, the rear end thereof, an outer step 25 extending around the outside wall at the proximity end of the tapered front extension 21, an inner step 26 extending around the tapered inside wall 27 thereof corresponding to the outer step 25 and disposed at one end of the tapered front extension 2.

The holding-down cap 40 comprises an axial through hole 41, a beveled edge 42 located on the inside wall thereof around the axial through hole and an inner thread 43 extending around the inside wall at a front side relative to the beveled edge 42. After installation of the cable and flexible conduit gland 100 to lock the flexible conduit 60 and the cable 70 together, the beveled edge 42 of the holding-down cap 40 is stopped at one end of the elastic packing ring 30 against the collar 20 and the casing 10.

During installation of the present invention, as shown in FIGS. 1 and 3, insert the collar 20 and the elastic packing ring 30 into the axial through hole 11 of the casing 10 to force the tapered front extension 21 against the tapered inner surface portion 111 of the casing 10 and to stop the stop flange 23 and outer step 25 of the collar 20 against one end (the rear end) and inner step 112 of the casing 10 respectively, and then thread the inner thread 43 of the holding-down cap 40 onto the first fastening member (outer thread) 13 of the casing 10.

Thereafter, insert the cable 70 and the flexible conduit 60 through the axial through hole 41 of the holding-down cap 40 into the center hole 31 of the elastic packing ring 30 and the axial through hole 22 of the collar 20, enabling the cable 70 to pass through the axial through hole 11 of the casing 10. During the installation process, the arrangement of the endless groove 32 of the elastic packing ring 30 enables the pawls 44 to be moved elastically back and forth in the radial direction so that the flexible conduit 60 can be moved axially over the beveled edges 331 of the pawls 33 to let the pawls 33 engage into one peripheral groove 61 of the flexible conduit 60, thereby stopping the flexible conduit 60 from backward displacement relative to the cable and flexible conduit gland 100. Further, the arrangement of the split 34 enables the elastic packing ring 30 to be expanded elastically, facilitating insertion of the flexible conduit 60. When fastening tight the holding-down cap 40, the elastic packing ring 30 is compressed to secure the flexible conduit 60 firmly in place.

After installation, the flexible conduit 60 is stopped with its front end against the inner step 26 of the collar 20 to provide a primary waterproof barrier, avoiding flowing of external water molecules along the flexible conduit 60 into the inside of the flexible conduit gland 100. At the same time, the outer step 25 of the collar 20 is stopped against the inner step 112 of the casing 10, the tapered inner wall 27 of the collar 20 is forced against the outside wall of the flexible conduit 60 to hold down the flexible conduit 60, and the stop flange 23 of the collar 20 is stopped against the rear end of the casing 10, providing a secondary waterproof barrier to prohibit flowing of external water molecules along the flexible conduit 60 into the inside of the flexible conduit gland 100. Further, the arrangement of the tapered front extension 21 of the collar 20 enhances securement of the cable 70 to the flexible conduit 60. Therefore, the flexible conduit gland 100 effectively locks the flexible conduit 60 and the cable 70 and exhibits excellent waterproof effects.

Referring to FIG. 4 and FIGS. 1~3 again, the flexible conduit gland 100 further comprises a gasket 50 prepared from an elastically deformable material, such as rubber, plastics or silicon rubber. The gasket ring 50 is sleeved onto the second fastening member 14 of the casing 10 and stopped at the vertical front wall 121 of the stop flange 12. Further, the gasket ring 50 has endless ribs 52 protruded from the rear side 51 thereof.

After installation of the flexible conduit gland 100 in the face panel of a box member of a machine (not shown), the gasket ring 50 is squeezed in between the stop flange 12 of the casing 10 and the face panel of the box member to seal the gap, prohibiting penetration of external fluid or water vapor.

Referring to FIGS. 1~3 again, the collar 20 has ribs 241 raised from and extending around the periphery. After installation, the ribs 241 of the collar 20 are forced against the inside wall of the casing 10, sealing off the gap between the collar 20 and the casing 10 and prohibiting passing of external water molecules along the flexible conduit 60 through the flexible conduit gland 100 into the box member of the machine.

Referring to FIGS. 1 and 4 again, the collar 20 has at least one dent 211 extending around the periphery of the tapered front extension 21. For example, one dent 211 is located on the middle of the tapered front extension 21 and extending around the periphery thereof. For locking a cable 70 that has a relatively greater outer diameter, cut off the front part of the tapered front extension 21 of the collar 20 along the dent 211 so that the diameter of the front end of the axial through hole 22 of the collar 20 becomes relatively greater for accommodating a relatively thicker cable 70. Thus, the collar 20 can fit cables 70 of different diameters.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A cable and flexible conduit gland for securing a cable and a flexible conduit to a box member, comprising:
   a casing, said casing comprising an axial through hole cut through front and rear ends of the casing, a middle stop flange extending around a periphery of the casing, a first fastening member and a second fastening member formed integrally with the periphery of the casing and respectively disposed at two opposite sides relative to said middle stop flange around the periphery of the casing, and a tapered inner surface portion located on an inside wall of the casing;

a collar inserted into the axial through hole of said casing, said collar comprising a tapered front extension fitting the tapered inner surface of said casing and an axial through hole cut through front and rear ends of the collar;

an elastic packing ring stopped against the rear end of said collar; and a holding-down cap fastened to said first fastening member of said casing to hold down said collar and said elastic packing ring, locking said flexible conduit and said cable together.

2. The cable and flexible conduit gland as claimed in claim 1, wherein said collar comprises at least one dent extending around a periphery of said tapered front extension.

3. The cable and flexible conduit gland as claimed in claim 1, wherein said collar is made of an elastic material.

4. The cable and flexible conduit gland as claimed in claim 1, wherein said collar comprises a plurality of ribs raised from and extending around the periphery of the collar.

5. The cable and flexible conduit gland as claimed in claim 1, wherein said collar further comprises a rear stop flange extending around the periphery of the collar at the rear end of the collar for stopping against the rear end of said casing, an outer step for stopping against a part inside said casing, a tapered inside wall for attaching to a periphery of an inserted flexible conduit and an inner step disposed at a front side relative to said tapered inside wall for stopping against an inserted end of the inserted flexible conduit.

6. The cable and flexible conduit gland as claimed in claim 5, wherein said casing further comprises an inner step for stopping against the outer step of said collar.

7. The cable and flexible conduit gland as claimed in claim 1, wherein said elastic packing ring comprises an inside wall defining a center hole, an endless groove located on a front end of the elastic packing ring around said center hole and a plurality of pawls extended from the inside wall of the elastic packing ring and equiangularly spaced around said center hole, each of the plurality of pawls having a beveled edge.

8. The cable and flexible conduit gland as claimed in claim 7, wherein said elastic packing ring further comprises a split cut through a periphery of the elastic packing ring.

9. The cable and flexible conduit gland as claimed in claim 1, wherein said holding-down cap comprises an axial through hole extending through front and rear ends of the holding-down cap and surrounded by an inside wall of the holding-down cap, and a beveled edge located on the inside wall around the axial through hole of the holding-down cap for stopping against a rear end of said elastic packing ring.

10. The cable and flexible conduit gland as claimed in claim 1, further comprising a gasket ring mounted around said second fastening member of said casing and stopped at said middle stop flange of said casing, said gasket ring comprising a plurality of ribs raised from one side of the gasket ring and stopped against a vertical front wall of said middle stop flange of said casing.

* * * * *